United States Patent
Blach

(10) Patent No.: US 7,425,090 B2
(45) Date of Patent: Sep. 16, 2008

(54) DEVICE FOR DISPERSING AND MELTING FLOWABLE MATERIALS

(75) Inventor: Josef A. Blach, Lauffen (DE)

(73) Assignee: Blach Verwaltungs GmbH & Co. KG, Lauffen (DE)

( * ) Notice: Subject to any disclaimer, the term of this patent is extended or adjusted under 35 U.S.C. 154(b) by 281 days.

(21) Appl. No.: 10/503,142

(22) PCT Filed: Dec. 12, 2002

(86) PCT No.: PCT/EP02/14105

§ 371 (c)(1),
(2), (4) Date: Jul. 30, 2004

(87) PCT Pub. No.: WO03/070442

PCT Pub. Date: Aug. 28, 2003

(65) Prior Publication Data

US 2005/0152214 A1    Jul. 14, 2005

(30) Foreign Application Priority Data

Feb. 20, 2002   (DE)  ................ 102 07 145

(51) Int. Cl.
*B29B 7/48* (2006.01)
(52) U.S. Cl. ................................... 366/85
(58) Field of Classification Search ......... 366/30–301; 425/204, 208, 209; 198/657–677
See application file for complete search history.

(56) References Cited

U.S. PATENT DOCUMENTS

| | | | |
|---|---|---|---|
| 4,041,115 A | * | 8/1977 | Jenkins et al. |
| 4,474,474 A | | 10/1984 | Blach |
| 4,908,169 A | * | 3/1990 | Galic et al. |
| 5,048,971 A | * | 9/1991 | Wall et al. ............. 366/85 |
| 5,819,839 A | * | 10/1998 | Mihelich et al. |
| 5,836,682 A | | 11/1998 | Blach |
| 6,116,770 A | * | 9/2000 | Kiani et al. ............. 366/82 |
| 6,170,975 B1 | * | 1/2001 | Andersen ............. 366/82 |
| 6,196,711 B1 | | 3/2001 | Blach et al. |
| 6,312,756 B1 | | 11/2001 | Dudacek et al. |
| 6,682,213 B2 | * | 1/2004 | Inoue et al. ............. 366/76.4 |

(Continued)

FOREIGN PATENT DOCUMENTS

DE    813 154    9/1951

(Continued)

OTHER PUBLICATIONS

International Search Report mailed Apr. 4, 2003 in PCT International Application No. PCT/EP02/14105 (2 pages).

*Primary Examiner*—Charles E Cooley
(74) *Attorney, Agent, or Firm*—Flynn, Thiel, Boutell & Tanis, P.C.

(57) ABSTRACT

An apparatus for dispersing and melting flowable substances includes axis-parallel supporting shafts rotatable in the same direction. Screw elements with the same direction of thread are fitted on the shafts so as to rotate in unison and intermesh. The screw elements have screw portions disposed at a progressive angular offset from each other with the same sense of rotation so as to form faces. The screw elements are of single- or double-flighted form. The axial length of each screw element is a fraction of the pitch of the screw crest of each screw portion.

16 Claims, 1 Drawing Sheet

U.S. PATENT DOCUMENTS

| | | |
|---|---|---|
| 6,745,818 B1 * | 6/2004 | Fan et al. |
| 7,188,992 B2 * | 3/2007 | Mattingly, Jr. ............... 366/82 |
| 2004/0141405 A1 | 7/2004 | Blach et al. |
| 2005/0024986 A1 * | 2/2005 | Mattingly, Jr. ............... 366/82 |
| 2005/0152214 A1 * | 7/2005 | Blach ........................ 366/85 |

FOREIGN PATENT DOCUMENTS

| | | |
|---|---|---|
| DE | 28 54 207 | 6/1980 |
| DE | 32 05 428 | 11/1982 |
| DE | 31 34 479 | 3/1983 |
| DE | 4328160 A1 * | 4/1994 |
| DE | 10157820 A1 * | 6/2003 |
| EP | 0 330 308 | 8/1989 |
| EP | 0 422 272 | 4/1991 |
| EP | 0 788 867 | 7/1999 |
| WO | WO 02/090087 | 11/2002 |

* cited by examiner

DEVICE FOR DISPERSING AND MELTING FLOWABLE MATERIALS

FIELD OF THE INVENTION

This invention relates to an apparatus for dispersing and melting flowable substances having axis-parallel support shafts rotatable in the same direction. The shafts rotate in unison and are provided with intermeshing screw elements.

BACKGROUND OF THE INVENTION

In the apparatus, not only are screw elements fitted on the supporting shafts, but also kneading blocks and similar processing elements for converting an optimum of the driving energy into kneading and mixing power.

To distribute the resin along the screw as evenly as possible during processing, DE 31 34 479 A1 discloses a screw extruder wherein a triple-threaded screw is divided into disks that are fitted on the supporting shaft at a progressive angular offset from each other. The resulting faces on the disks must be provided with central shoulders halfway up so that the relevant faces can move past each other freely upon rotation of the screw.

Due to geometrical relations, the triple-threaded screw machine can only be executed up to a maximum ratio of outside screw diameter to screw core diameter of less than 1.3661. At the same time, both the effective screw surface on the face and the surface of the intermesh zone are relatively small, making the processing efficiency practically negligible.

Due to the numerous disks, the known apparatus moreover involves considerable production effort. But, above all, the many possible angular positions of the disks easily lead to errors when fitting them on, in particular when several screws are to be fitted. Also, the disks considerably reduce the bending strength of the screw shaft for transfer of radial forces, which increases partial wear and risk of breakage.

The problem of the invention is to provide a screw machine that can be equipped with screw elements like a conventional screw machine, but leads to optimal homogenization with optimal conversion of its driving energy.

SUMMARY OF THE INVENTION

Optimal homogenization with optimal conversion of driving energy is obtained according to the invention with an apparatus for dispersing and melting flowable substances having axis-parallel supporting shafts rotatable in the same direction on which screw elements with the same direction of thread are fitted so as to rotate in unison. At least for one pair of intermeshing screw elements, each screw element consists of screw portions that are disposed at a progressive angular offset from each other with the same sense of rotation so as to form faces and are of single- or double-flighted form.

According to the invention, single- or double-flighted screw elements of normal length are fitted on the supporting shafts formed as spline shafts. The length of the process part of the apparatus corresponds to at least ten times the outside diameter of the screw elements. The speed of the shafts is at least 100 revolutions per minute.

In contrast to a normal screw extruder having screw elements with continuous screw flights, however, at least some of the screw elements of the inventive apparatus are formed by single- or double-flighted screw elements consisting of portions rotated against each other progressively with the same sense of rotation. This causes a number of faces corresponding to the number of flights to be formed on both sides of each portion, so that the substance to be processed is disturbed in its flow along the shear edge of the screw crest and split up, resulting in intimate intermixture.

When dispersing solids in a viscous matrix it was hitherto impossible to comminute the particles and agglomerates optimally. One of the reasons for this is an excessive partial pressure buildup, which leads to high energy consumption with a corresponding temperature increase but produces insufficient agglomerate comminution.

Solids in the micron range, such as dyes, which must form agglomerates in a liquid, are torn apart by a flow due to pressure differences for them to be comminuted. The inventive apparatus, unlike known screw extruders with kneading blocks and the like, produces elongational flows that act on these agglomerates without any essential temperature increase. The unproductive energy share is thus considerably reduced according to the invention.

According to the invention, the conveying single- and/or double-flighted screw flights of the screw portions of the screw element are of relatively short design. That is, the screw crest of each screw portion is only a fraction of the pitch. The axial distance of the screw crest of each screw portion is preferably not greater than the screw flight depth. The axial lengths of the screw crests of the screw portions of each screw element can also be formed differently.

The progressive angular offset of the screw portions of each screw element from each other in the same sense of rotation forms faces that are angularly offset in step-like fashion.

The angular offset of the screw portions of each screw element is preferably repeated at most after two thirds of the pitch.

The single- or double-flighted design of the screw elements obtains relatively large, effective faces.

|  | Prior art | Inventive design | | | |
|---|---|---|---|---|---|
| Center distance a | 25 mm | 25 | 25 | 25 | 25 |
| Outside screw diam. D | 28.3 mm | 28.3 | 28.3 | 30 | 30 |
| Screw core diam. d | 21.2 mm | 21.2 | 21.2 | 19.5 | 19.5 |
| Number of flights | 3 | 2 | 1 | 2 | 1 |
| D:d | 1.3349 | 1.335 | 1.335 | 1.539 | 1.539 |
| Intermesh surface (8) | 32.9 | 32.9 | 32.9 | 60.46 | 60.46 |
| Effective face (16) | 168 | 204 | 240 | 271 | 339 |

The calculation shows that a double-flighted screw has a 21 percent, and the single-flighted screw a more than 42 percent, larger effective face compared to a triple-threaded one of the same size with otherwise identical dimensions. If the outside diameter is increased from 28.3 to 30 millimeters at a constant center distance, the crucial values (16) and (8) are even almost doubled.

The effectiveness of the faces furthermore depends on the angle by which the screw portions of a screw element are offset from each other. This angle of offset is preferably selected as great as possible, i.e. it is for example about 180° for single-flighted screw portions and about 90° for double-flighted screw portions.

The faces are additionally wetted and thus gained as dispersing surfaces. Moreover, the effectiveness of the homogenization and dispersing process depends on the distance assumed by the faces of the screw portions of one shaft from the adjacent faces of the screw elements of the other shaft in the intermesh zone of the two screw shafts of the screw machine. Increasing distance of the faces increases the free radial flow cross section, thereby making the shear rate in the intermesh zone smaller. Since the flow directions in the intermesh zone are completely different from outside the intermesh zone, the product is subjected to highly effective homogenization and dispersion processes with the inventive apparatus by elongation and compression in the intermesh zone. However, what is crucial for the good dispersion result obtained with the inventive apparatus is that the repeated sequence of free flow, axial feed in the screw flight and in the intermesh zone, which can take place without a decrease in viscosity, causes the fracture surfaces of the comminuted agglomerate to be wetted before a force takes effect on the agglomerate again to comminute it further.

Screw elements fitted on supporting shafts can be equipped with only one spline for power transmission and positioning. In this case, the axial length of a screw portion of a double-flighted screw element can be an integral multiple of half the pitch. That is, at a pitch of for example 30 millimeters the axial length of a screw portion can be 15 millimeters or a multiple thereof. However, modern supporting shafts are executed for better power transmission with a splining having a great number of teeth, for example 24 teeth. In this case, the axial length of a screw portion of a single-flighted screw element can be one 24th of the pitch, i.e. at a pitch of e.g. 30 millimeters the axial length of a screw portion can be 1.25 millimeters or a multiple thereof. That is, the axial length of a screw portion preferably results from the formula: pitch divided by the product of number of flights and number of teeth of the splining, or a multiple thereof.

Obviously, shorter screw portions can be formed with a small number of flights and/or high number of teeth of the splining. However, the angular offset of the screw portions of each screw element is preferably repeated at most after three quarters of the pitch.

However, the screw element can also have one or more screw portions whose axial length corresponds to or is greater than the length of a pitch. The axial length of the screw crests of the screw portions of a screw element can thus be formed differently. Preferably, the pitch of the screw portions of the screw element is equal to or greater than the outside screw diameter. The angle of offset between the adjacent screw portions of a screw element can be the same for all screw portions, or different angles of offset can be used.

The inventive screw machine conveys solids without exertion of pressure axially by one pitch at one revolution of the screw element, while viscous substances are conveyed at most by half a pitch at one revolution of the screw element. The conveying behavior of the screw elements of the inventive apparatus is thus crucially dependent on the internal friction of the conveyed substances, i.e. on viscosity in the case of viscous substances.

The angular offset of the following screw portion from the previous screw portion gives rise to a free face in the free screw flight, which leads to an essential change in the axial substance flow.

That is, the substance is first retained axially by said faces and accelerated or elongated again, substantially in the new radial direction of rotation of the screw shafts. The interaction of screw and housing is followed in the circumferential direction in the intermesh zone by the interaction of the screw in question with the counter-screw, which takes place substantially without influence of the housing and is characterized by strong acceleration of material. Simultaneously there is partly a sharp deflection of material flow and a sliding of the free faces of the involved screws past and against each other, which in turn leads to diverse intensive elongation and shear processes. It is important that the total material flow and not only a partial zone is in turn involved here.

To increase effectiveness and repeat the processes, the inventive screw elements each have at least three screw portions.

An angular offset from screw portion to screw portion of the screw element by about half the flight angle is preferred, since this results in faces with a large surface, i.e. large wettable surfaces, to obtain the greatest possible effect.

Uniform opening cross sections of the screw elements perpendicular to the rotation axis in the radial screw clearance can moreover lead to a uniform flow distribution over the individual flights in the case of double-flighted screws.

At the same time, the inventive screw element can be easily fitted on the supporting shaft like a conventional screw element.

To obtain maximally effective energy consumption through elongation and shear in the intermesh zone, the faces of the screw elements of one shaft are disposed at a distance from the adjacent faces of the screw elements of the other shaft in the intermesh zone of the two screw shafts. For this purpose, the faces of the screw portions are preferably formed as conical surface portions coaxial with the rotation axis, whereby the conical surface portions of the two faces of a screw portion lie on a double cone with a common base, or the mutually opposing faces of adjacent screw portions on a double cone with a common axis. The cone angle, i.e. the angle between the rotation axis and the conical surface in which the face lies, is preferably at least 50°, in particular between 60 and 80°.

The inventive apparatus has at least two intermeshing screw shafts, but can also have more intermeshing screw shafts, for example a plurality of shafts disposed along a circle with the same central-angle distance within a space in a housing according to EP 0788867 B1.

BRIEF DESCRIPTION OF THE DRAWINGS

In the following the invention will be explained in more detail by way of example with reference to the drawing, in which.

DESCRIPTION OF THE PREFERRED EMBODIMENT(S)

Figure 1:
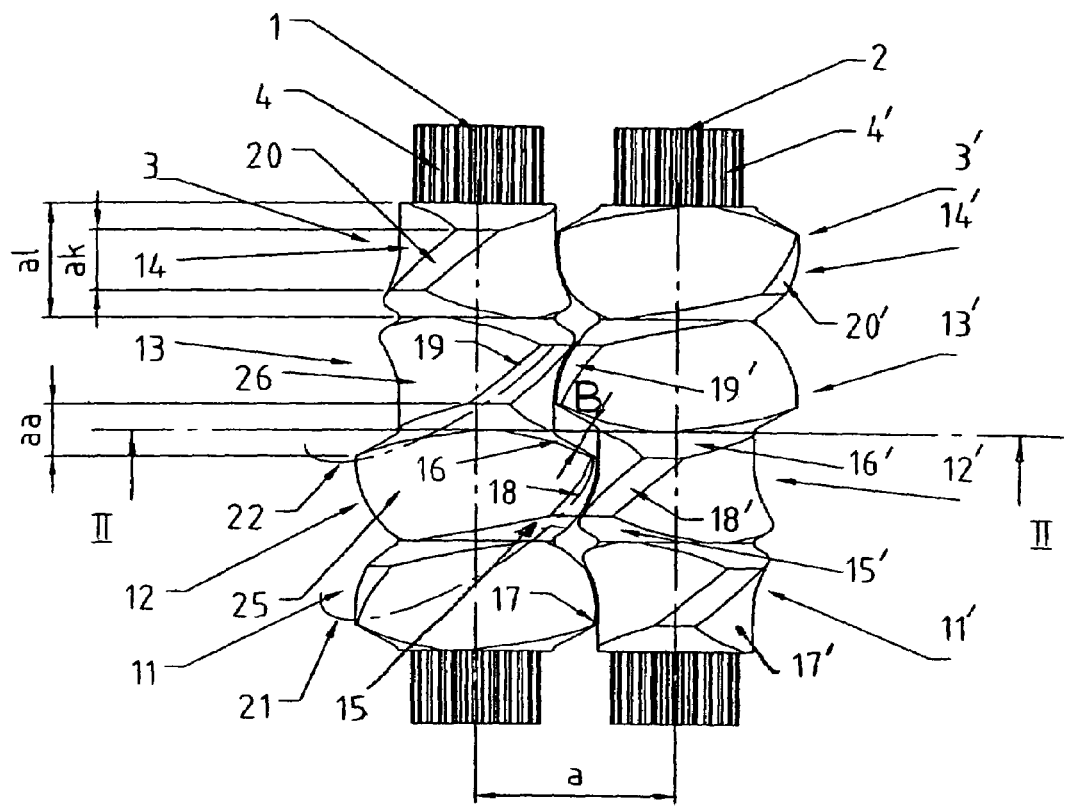
FIG. 1 shows a side view of two intermeshing screw elements.
Figure 2:
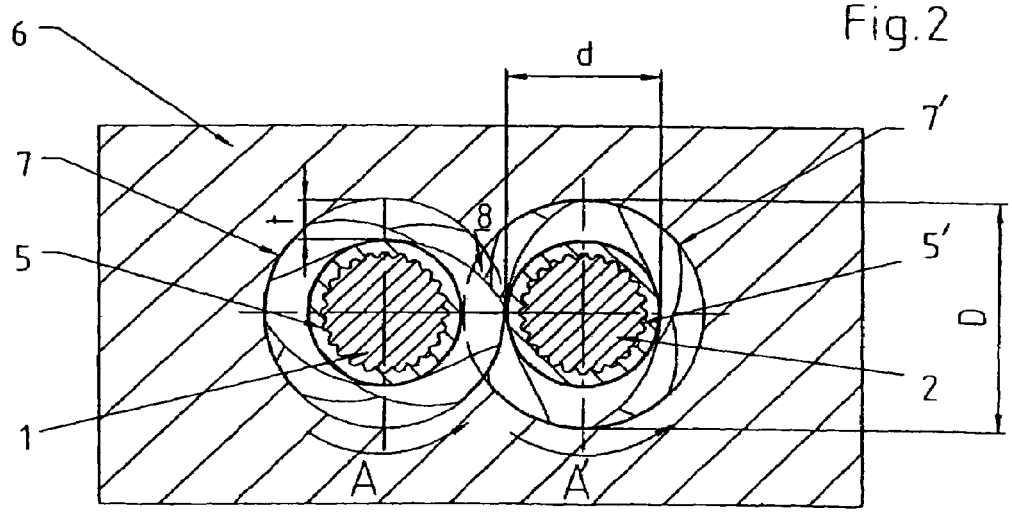
FIG. 2 shows a cross section along line II-II according to FIG. 1 through the screw elements disposed in a housing.

Accordingly, two axis-parallel supporting shafts 1, 2 are driven by a gear (not shown) in the same direction in accordance with arrows A, A'. Each supporting shaft 1, 2 bears a plurality of screw elements, whereby only one screw element 3, 3' is shown on each supporting shaft 1, 2.

For a connection ensuring rotation in unison of screw elements 3, 3', supporting shafts 1, 2 are provided with a splining with a plurality of ridges or teeth 4, 4' engaging a corresponding number of longitudinal grooves 5, 5' in a hollow bore of the core of screw elements 3, 3' that forms the spline hub. The screw elements are thereby interchangeable on the supporting shafts.

Housing 6 is provided with two bores 7, 7' receiving shafts 1, 2 with screw elements 3, 3'. Bores 7, 7' intersect in cross section so that screw elements 3, 3' mesh in zone 8.

Screw elements 3, 3' are integral, i.e. each consist of only one monolithic part with the hollow bore, having screw portions 11, 12, 13, 14 and 11', 12', 13', 14', respectively. Screw portions 11, 12, 13, 14; 11', 12', 13', 14' of screw elements 3, 3' are angularly offset from each other progressively in the same sense of rotation by the same angle and free of joints between the screw portions as seen in FIG. 1.

Each screw portion 11, 12, . . . thus has front and back faces 15, 16; 15', 16'. Screw portions 11, 12, . . . are identical. That is, they are each double-flighted and have the same pitch angle and the same axial length.

As shown in FIG. 1 for screw element 3 on shaft 1, however, screw crests 17, 18, 19, 20, 17', 18', 19', 20' of each screw element 3, 3' do not extend along one helical line but along mutually parallel helical lines 21, 22, . . . .

Axial length al of double-flighted screw portions 11, 12, . . . , i.e. the angular offset of screw portions 11, 12, . . . , is repeated after the same fraction of the pitch in each case. The axial length al of each screw portion 11, 12, . . . is a fraction of the pitch of the screw crests 21, 22 . . . of each screw portion 11, 12 . . . . The axial length al of each screw portion 11, 12, . . . is at most two thirds of the pitch.

Axial distance or length ak of screw crests 21, 22, . . . of each screw portion 11, 12, . . . is not greater than screw flight depth (t). The axial lengths ak of the screw crests 21, 22 . . . of the screw portions 11, 12, . . . of each screw element 3, 3' are different. The axial distance ak of the screw crest of each screw portion is not greater than the screw flight depth t times tg (90° cone angle of face 15, 15', 16) times 2, where tg represents tangent.

Faces 15, 16, 15', 16', . . . of all screw portions 12, 12' . . . lie on cones coaxial with shafts 1, 2, whereby the two faces 15, 16; 15', 16' of screw portion 12, 12' lie on a double cone with a common base. The cone angle is the same in each case and can be for example 70°.

The surface of each screw portion 11, 12, . . . is thus composed of the two faces 15, 16, . . . , the two crests 17, 18, . . . and screw surfaces 25, 26 between the two crests.

In intermesh zone 8, faces 15, 16, . . . of screw element 3 on shaft 1 are at distance B from the adjacent faces of screw element 3' on shaft 2.

The invention claimed is:

1. An apparatus for dispersing and melting flowable substances having at least two axis-parallel supporting shafts rotatable in the same direction on which screw elements with the same direction of thread are fitted so as to rotate in unison with said shafts, with which adjacent shafts intermesh, wherein for at least one pair of intermeshing screw elements, each said screw element comprises a plurality of screw portions that are disposed successively one next to the other along a length of said screw element, each said screw portion being disposed at a progressive angular offset from the next successive one of said screw portions, said screw portions having the same sense of rotation so as to form faces, wherein said faces of each said screw portion are at a progressive angular offset relative to said faces of said next successive screw portion and the pair of said screw elements are both of single-flighted or double-flighted form, wherein each said screw element comprises a monolithic screw element including the plurality of said screw portions at said progressive angular offset wherein said monolithic screw element is free of joints between said screw portions.

2. An apparatus according to claim 1, wherein the axial length (al) of each said screw portion is a fraction of the pitch of a helical screw crest of each said screw portion that wipes the surface of a chamber containing the shaft.

3. An apparatus according to claim 2, wherein the axial length (al) of each said screw portion is at most two thirds of the pitch.

4. An apparatus according to claim 2, wherein axial lengths (ak) of the helical screw crests of the screw portions of each said screw element are different.

5. An apparatus according to claim 1, wherein the adjacent screw portions of one said screw element have different angles of offset.

6. An apparatus according to claim 1, wherein the pitch of the screw portions is equal to or greater than the screw diameter.

7. An apparatus according to claim 1, wherein the faces of the screw portions lie on cones coaxial with the rotation axis, wherein the cones on which the faces of a said screw portion lie form a double cone with a common base.

8. An apparatus according to claim 7, wherein the axial distance (ak) of a screw crest of each said screw portion is not greater than the screw flight depth (t)×tangent tg (90° cone angle of face)×2.

9. An apparatus according to claim 7, wherein the cone angle is at least 50°.

10. An apparatus according to claim 1, wherein at least one said screw element has at least one said screw portion whose axial length corresponds to twice the screw diameter.

11. An apparatus for dispersing and melting flowable substances comprising:

a housing having an opening therein;

at least two axis-parallel spaced supporting shafts provided in the opening within said housing, said supporting shafts being rotatably driven in unison in the same direction; and at least two individual monolithic hollow screw elements, each said screw element being mounted about one of said supporting shafts with each said monolithic screw element extending substantially the entire length of said supporting shaft, said screw elements rotating in unison, wherein each said monolithic screw element defines a plurality of screw portions that are disposed axially adjacent to each other, each said screw portion being disposed at a progressive angular offset from each said screw portion disposed axially adjacent thereto, each said screw portion having the same sense of rotation so as to form faces, wherein said faces of each said screw portion are at a progressive angular offset relative to said faces of each said screw portion disposed axially adjacent thereto and said screw portions of the monolithic screw elements on said supporting shafts are fitted within said housing to intermesh with each other.

12. An apparatus according to claim 11, wherein the pair of said screw elements are both of single-flighted or double-flighted form.

13. An apparatus according to claim 11, wherein the faces of the screw portions lie on cones coaxial with the rotation axis, wherein the cones on which the faces of said screw portions lie form a double cone with a common base, and wherein the axial distance (ak) of a screw crest of each said screw portion is not greater than the screw depth (t)× tangent tg (90 degree cone angle of face)×2.

14. An apparatus according to claim 11, wherein at least one said screw element has at least one said screw portion whose axial length corresponds to twice the screw diameter.

15. An apparatus according to claim 11, wherein said apparatus comprises a twin-screw apparatus.

16. An apparatus for dispersing and melting flowable substances comprising:
- a housing having an opening therein;
- at least two axis-parallel spaced supporting shafts provided in the opening within said housing, said supporting shafts being rotatably driven in unison in the same direction; and
- at least two individual hollow monolithic screw elements, each said screw element being mounted about the periphery of a respective said supporting shaft and extending substantially the entire length of the respective supporting shaft, said screw elements rotating in unison,
- wherein each said monolithic screw element defines a plurality of screw portions that are disposed one next to the other so that each said screw portion is at a progressive angular offset from each adjacent one of said screw portions, said screw portions having the same sense of rotation so as to form faces wherein said faces of each of said screw portions are at a progressive angular offset relative to said faces of the next said screw portion, and said screw portions of the monolithic screw elements on said supporting shafts are fitted within said housing to intermesh with each other, wherein the faces of the screw portions form cones coaxial with the rotation axis so that the cones on which the faces of a said screw portion lie form a double cone with a common base,
- wherein said monolithic screw elements each provide a bending strength for transfer of radial forces that reduces partial wear and risk of breakage thereof as compared to separate individual screw portions provided adjacent each other on a shaft, and
- wherein said monolithic screw elements are interchangeable on said supporting shafts.

* * * * *

UNITED STATES PATENT AND TRADEMARK OFFICE
CERTIFICATE OF CORRECTION

| | |
|---|---|
| PATENT NO. | : 7,425,090 B2 |
| APPLICATION NO. | : 10/503142 |
| DATED | : September 16, 2008 |
| INVENTOR(S) | : Josef A. Blach |

It is certified that error appears in the above-identified patent and that said Letters Patent is hereby corrected as shown below:

At the cover page, field [54] please replace:

"DEVICE FOR DISPENSING AND MELTING FLOWABLE MATERIALS"

with

--APPARATUS HAVING AXIS-PARALLEL SUPPORT SHAFTS CARRYING SCREW ELEMENTS FOR DISPENSING AND MELTING FLOWABLE SUBSTANCES--.

Column 1, first two lines, replace:

"DEVICE FOR DISPENSING AND MELTING FLOWABLE MATERIALS"

with

--APPARATUS HAVING AXIS-PARALLEL SUPPORT SHAFTS CARRYING SCREW ELEMENTS FOR DISPENSING AND MELTING FLOWABLE SUBSTANCES--.

Signed and Sealed this

Ninth Day of December, 2008

JON W. DUDAS
*Director of the United States Patent and Trademark Office*